United States Patent
Gadini

(10) Patent No.: US 6,766,812 B1
(45) Date of Patent: Jul. 27, 2004

(54) HOUSEHOLD APPLIANCE USING WATER, NAMELY, A WASHING MACHINE, WITH IMPROVED DEVICE FOR REDUCING THE WATER HARDNESS

(75) Inventor: Costanzo Gadini, Casale Monferrato (IT)

(73) Assignee: Eltek S.p.A., Casale Monferrato (IT)

( * ) Notice: Subject to any disclaimer, the term of this patent is extended or adjusted under 35 U.S.C. 154(b) by 0 days.

(21) Appl. No.: 09/959,045

(22) PCT Filed: Apr. 21, 2000

(86) PCT No.: PCT/IB00/00496

§ 371 (c)(1),
(2), (4) Date: Jan. 2, 2002

(87) PCT Pub. No.: WO00/64325

PCT Pub. Date: Nov. 2, 2000

(30) Foreign Application Priority Data

Apr. 22, 1999  (IT) ........................................ TO99A0320

(51) Int. Cl.[7] ............................ B08B 7/00; D06F 33/00; C25B 9/00
(52) U.S. Cl. ................ 134/56 D; 134/57 D; 134/58 D; 134/109; 68/13 A; 204/242; 204/275.1
(58) Field of Search ............................ 134/56 D, 57 D, 134/58 D, 109, 110, 111, 113, 201; 68/13 A, 207; 204/242, 252, 275.1

(56) References Cited

U.S. PATENT DOCUMENTS

| | | | | |
|---|---|---|---|---|
| 2,825,666 A | * | 3/1958 | Stoddard | 134/25.2 |
| 2,980,598 A | * | 4/1961 | Stoddard | 205/688 |
| 4,481,086 A | * | 11/1984 | Bianchi et al. | 204/229.6 |
| 4,671,863 A | * | 6/1987 | Tejeda | 204/266 |
| 5,947,135 A | * | 9/1999 | Sumida et al. | 134/95.3 |
| 6,284,124 B1 | * | 9/2001 | DiMascio et al. | 205/753 |
| 2003/0213503 A1 | * | 11/2003 | Price et al. | 134/18 |
| 2003/0213505 A1 | * | 11/2003 | Price et al. | 134/25.2 |

FOREIGN PATENT DOCUMENTS

| | | |
|---|---|---|
| DE | 3533098 A | 3/1987 |
| DE | 3640881 A | 6/1988 |
| DE | 4238450 A | 5/1994 |
| DE | 4446731 A | 6/1996 |
| EP | 0163605 A | 12/1985 |
| EP | 0467028 A | 1/1992 |
| EP | 0761156 A | 3/1997 |
| FR | 1594368 A | 6/1970 |
| FR | 2650172 A | 2/1991 |
| FR | 2667306 A | 4/1992 |
| GB | 809685 A | 3/1959 |
| GB | 2210256 A | 6/1989 |
| WO | WO 9816477 A | 4/1998 |

* cited by examiner

Primary Examiner—Frankie L. Stinson
Assistant Examiner—Joseph L Perrin
(74) Attorney, Agent, or Firm—Levine & Mandelbaum

(57) ABSTRACT

A household appliance using water is described, namely a washing machine, comprising a control system, a water supply system from an external source (108, 109), a softening system of at least a portion of the supplied water (110; 110', 117; 117'), an electrochemical cell (110; 117; 117'), for treating at least a portion of the supplied water. According to the invention, said electrochemical cell (110; 117; 117') is active part of said water softening system (110; 110', 117; 117').

23 Claims, 6 Drawing Sheets

HOUSEHOLD APPLIANCE USING WATER, NAMELY, A WASHING MACHINE, WITH IMPROVED DEVICE FOR REDUCING THE WATER HARDNESS

DESCRIPTION

The present invention relates to a household appliance utilizing water, in particular a washing machine, comprising a device for reducing the water hardness.

As it is known, certain household appliances like washing machines, in particular household dishwashers, are provided with a system, also known as a water decalcifier or softener, for reducing the water hardness; in particular, this system is provided for reducing the calcium and magnesium contents of the water used for washing purposes, which may inhibit the action of detergents and produce calcareous deposit; in fact, calcareous deposits are due to an excessive amount of calcium ions (Ca++) and magnesium ions (Mg++) contained in the water supplied by the main; in particular, calcium ions and magnesium ions are cation, i.e. ions with a positive electric charge.

To this purpose, the decalcifier provides for exchanging the calcium and magnesium ions of the water with sodium ions (Na+) contained in suitable decalcifying resins, which are in fact cationic, and therefore able to retain the positively charged calcium and magnesium ions. These resins, which are shaped like small balls, are placed in an appropriate container pertaining to the decalcifier, which is flushed through by the water supplied from the main.

Since the above resins exhaust their softening capability after a certain volume of treated water, they have to be regenerated by flushing them through with a water and sodium chloride solution (NaCl), commonly called brine; in this way, the calcium and magnesium ions deposited on the resins are replaced by the sodium ions of the brine, so that the resins are ready again for a new softening phase; in most instances, such a resins regenerating process occurs at each wash cycle performed by the machine.

Therefore, water softening systems as above have to provide a salt container, which needs to be regularly topped up by the user, due to the consumption caused by the periodical resin regenerating processes.

In main line, it should be considered how the higher the water hardness degree is, the faster resins become exhausted, whereby a greater salt consumption is needed for resins regeneration; therefore, in other words, the salt consumption may be considered directly proportional to the hardness degree of the water used by the washing machine.

In order to reduce salt and water waste, some washing machines do not perform a resins regeneration phase at each wash cycle, but less frequently, typically after a predetermined amount of water have been softened; in other known solutions, the washing machine is equipped with water hardness sensors, which activate the regeneration phase only upon detecting that water hardness is not low enough, due to resins exhaustion; according to other solutions also utilizing water hardness sensors, the amount of brine supplied to the resins compartment is variable and proportional to the water hardness degree ascertained.

At any rate, the above softening technique has been well known and affirmed for several years in the field of household washing machines, based on its satisfactory reliability and convenience.

However, it is obvious that the above technique presumes a periodic maintenance or operation to the system by the user, which consists in topping up the salt in the relevant container; it is also clear that, whenever salt is not topped up and the resins cannot be regenerated, the system will not perform wash water decalcification as required.

To this purpose it will also be appreciated that the user should be promptly warned about a likely lack of salt in the relevant container; to this purpose, therefore, the washing machine should have appropriate sensing means indicating salt availability, usually based on the use of floats and relevant signalling means, such as a warning light.

However, these sensing means are subject to failure or clogging, so that the salt container may remain erroneously empty, with an ensuing wrong and useless operation of the decalcifying system.

It is the aim of the present invention to solve the above problems.

Accordingly, the present invention has the aim to provide a household appliance utilizing water, such as a washing machine, which is equipped with a system for reducing the water hardness requiring no special regeneration agents for the materials used for water decalcification.

A further aim of the present invention is to provide a household appliance wherein the frequency of maintenance interventions and/or components replacement is minimized, which does not likely require periodic operations, such as the replacement of the above materials, at least for a period of time equal to the average useful life of a similar known household appliance.

In order to achieve such aims, it is the object of the present invention a household appliance utilizing water, in particular a washing machine, having a system for reducing the water hardness incorporating the features of the annexed claims, which form an integral part of the present description.

Further objects, features and advantages of the present invention will become apparent from the following detailed description and annexed drawings, which are supplied by way of non limiting example, wherein.

Figure 1:
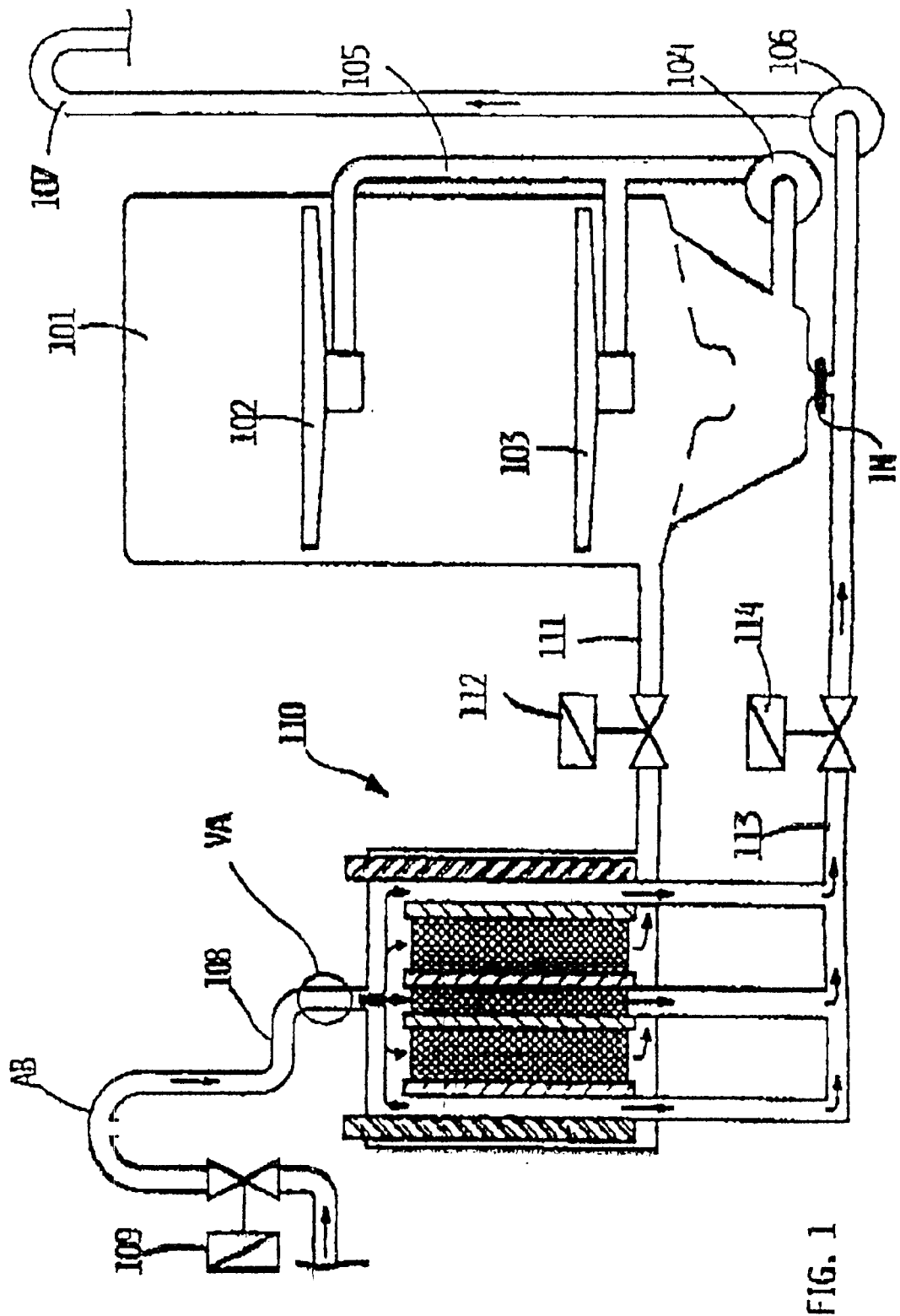
FIG. 1 shows the basic diagram of a further possible embodiment of the washing machine according to the present invention, in a first operating condition.

The idea at the basis of the present invention is that of realizing a household appliance using water, in particular a washing machine, whose water softening system is based on the use of at least an electrochemical cell.

It should be noticed that systems for the electric deionization of liquids are known, and used in combination with further treatment systems (filtering, reverse osmosis, etc.), for producing very pure water, i.e. with a minimum concentration of organic and mineral substances media, typically for laboratory use; in this frame, electric deionization systems offer a valid alternative to the more traditional distillation processes, which involve a clearly higher water consumption and decidedly longer treatment times.

Quite schematically, in the known electrodeionization systems, the fluid to be treated is conveyed in continuous in a plurality of channels placed side by side, being delimited by special membranes, whereas some of said channels contain ionic exchange resins; some channels containing the resins are connected to an outlet for the "purified" fluid, while the remaining channels are connected to an outlet for the "polluted" fluid; moreover, a direct electric voltage is applied to the fluid by means of two electrodes between which the various channels are defined.

For operation purposes, the fluid flowing across the channels containing the treatment resins is deionized by the latter (which provides for retaining both anions and cations); the simultaneous application of the electric current causes the anions and cations tied with the resins to migrate towards the anode and the cathode, respectively; doing so, these ions reach the channels connected to the outlet of the polluted fluid, i.e. enriched with ions, so as to be discharged.

Therefore, as it can be noticed, the system described above does not require the use of any special regenerating media for the treatment resins, since their effectiveness is constantly restored by the application of the electric voltage and the consequent ions migration.

According to the present state of the art, washing machines fitted with electrochemical cells for reducing water hardness are not known; vice-versa, solutions are known where a different type of electrochemical cell is paired to the conventional decalcifying system of a washing machine.

In such solutions, the container for the salt required for regenerating the water softening resins is connected to the electrochemical cell, which is connected in turn to the wash tub; in this way, some brine can be periodically conveyed to the cell, from which, following an electrolytic process, sodium hypochlorite or chlorine gas is produced, used as a cleaning and disinfectant agent for the crockery.

Therefore, as it can be seen, in these solutions the above electrochemical cell is not used for the decalcification of the water being necessary for the machine operation, which presumes necessarily on the contrary the presence of a conventional softening system, i.e. comprising a container for the salt required for the regeneration of the ionic exchange resins.

In FIG. 1, reference 101 indicates schematically a treatment chamber or wash tub of a washing machine realized according to the present invention.

In the given example, such a washing machine consists of a generic dishwasher, whose tub 101 has wash fluid spraying means, which are represented by two known rotary spraying arms 102 and 103; reference 104 indicates a wash pump for picking up the wash liquid from the tub bottom 101 and convey it through an appropriate duct 105 to the arms 102 and 103.

Reference 106 indicates a drain pump for discharging the liquid supplied to the machine; to this purpose, an appropriate discharge pipe 107 is connected to the outlet of the pump 106.

Reference 108 indicates a duct for the water supply from a household water mains, fitted with a supply valve 109; this valve 109 is of the known type and controlled by the control system (not shown in the figures) of the machine according to the present invention, which is provided for allowing the supply of the fresh water being necessary for the washing according to appropriate times and procedures.

The duct 108, downstream the valve 109, has a so-called air break device, indicated with AB.

Reference 110 indicates as a whole a decalcifier device of the electro-deionization type, comprising ionic exchange resins, as described in detail with reference to FIG. 2; the decalcifier 110 has an appropriate inlet connected to the duct 108; a valve VA is provided on such an inlet, whose function will be described later.

A first duct 111 departs from the decalcifier 110, which is connected at its other end to the tub 101, whose primary function is to convey the water from the mains and softened through the decalcifier 110 to the tub; as it can be seen, a second valve 112, of the known type, is also provided on this duct 111, which is controlled by the machine control system for the purposes to be further described.

A second duct 113 also departs from the decalcifier 110, which is connected to the drain outlet of the tub 101; the other end of this duct 113 is connected to the suction pipe of the drain pump 106; the second duct 113 upstream the drain outlet of the tub 101 has a third valve 114, of the known type and controlled by the machine control system. IN indicates a generic intercepting device, being of known realization, located between the drain outlet of the tub 101 and the duct 113.

As it will be clear in the following, the duct 113, the valve 114 and the intercepting device IN are utilized for draining the water used for the regeneration of the ionic exchange resins being present in the decalcifier 110.

It should be noticed that the various valves of the system described above are of the normally closed type; therefore, for the purposes of the present description, they have to be considered in a closed condition, save if otherwise specified.

The decalcifier 110 may comprise appropriate sensing means, not shown in the figures, for detecting some operative parameters, such as conductivity, water hardness and pH degree of the water entering and flowing out of the decalcifier 110.

Figure 2:
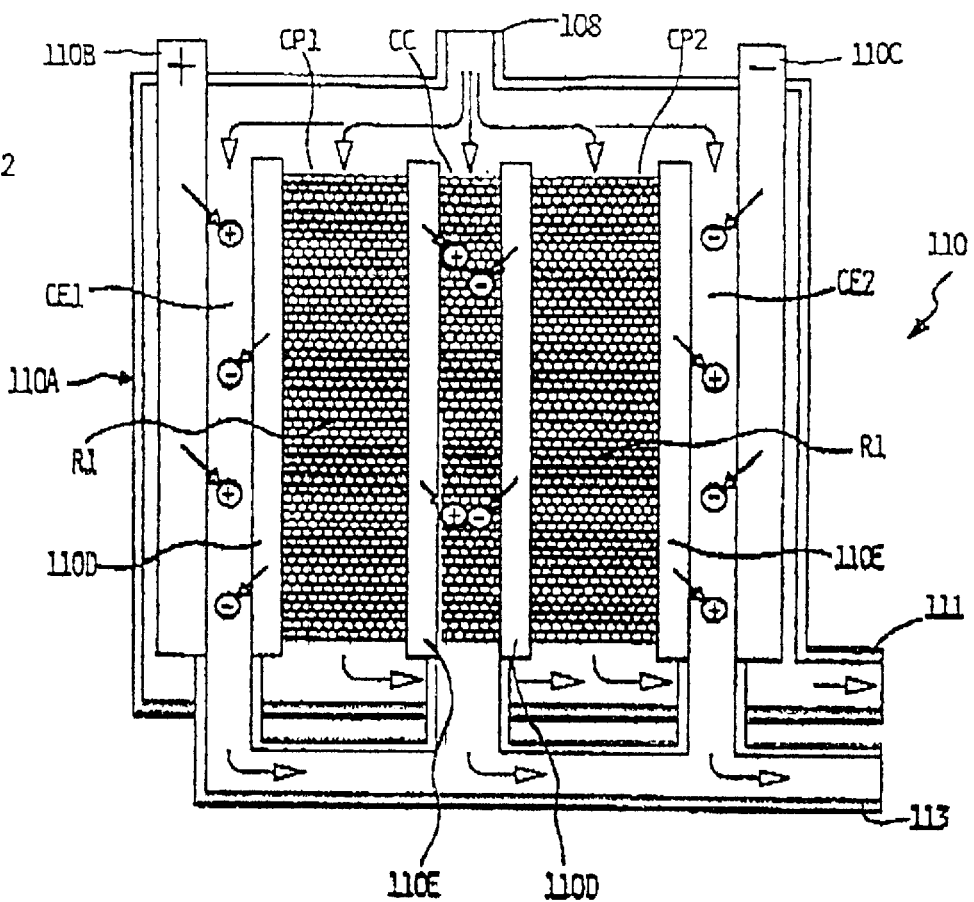
FIG. 2 shows a detail of a component of the machine represented in FIG. 1.

FIG. 2 represents in a more detailed way the decalcifier 110, which comprises a body 110A, for example being realized in thermoplastic material.

Within the body 110A, at its two lengthwise ends, respective electrodes are arranged, and namely a positive electrode or anode indicated with 110B, and a negative electrode or cathode, indicated with 110C.

Appropriate membranes of known type are arranged between the anode 110B and cathode 110C, for defining a series of channels within the body 110A.

In particular, 110D indicates membranes permeable to anions, i.e. the ions having a negative electric charge, which in the course of an electrodialysis process or anyway under the effect of an electric current or voltage migrate to an anode; 110E indicates on the contrary membranes permeable to cations, i.e. the ions having a positive electric charge, which in the course of an electrodialysis process or anyway under the effect of an electric current or voltage migrate to a cathode.

As it can be seen, the membranes 110D are alternated to the membranes 110E, so as to define within the body 110A:

two channels for the electrodes, indicated with CE1 and CE2, extending substantially between the anode 110B and a membrane 110D, and between the cathode 110C and a membrane 110E, respectively;

at least a concentration channel, indicated with CC, delimited by a membrane 110E and a membrane 110D;

at least two purification channels, indicated with CP1 and CP2, extending between a membrane 110D and a membrane 110E; in particular, the channel CP1 extends from the membrane 110E delimiting one side of the channel CC to the membrane 110D delimiting one side of the channel CE1, whereas the channel CP2 extends from the membrane 110D delimiting one side of the channel CC to the membrane 110E delimiting one side of the channel CE2.

In the example shown in the figures, the resins R1 are arranged within the purification channels CP1–CP2 and the concentration channel CC; these resins comprise in particular a mixture or mixed bed of anionic exchange resins and cationic exchange resins; preferably, the balls of the two types of resin are substantially equal in dimensions and/or specific weight, in order to avoid their laying one on top of the other, without mixing together.

According to a significant aspect of the present invention, the cationic resins used in the decalcifier 110 are resins of the H+ type, whereas the anionic resins provided in the same device are resins of the OH–. It should be underlined that conventional softening systems for washing machine use cationic resins of the Na+ type and/or anionic resins of the Cl-type.

Moreover, the provision of a mixed bed of cationic resins of the H+ type and anionic resins of the OH– type is considered preferable, so that, from the regeneration process further described, it will result a substantially neutral water, being not too acid, as it would occur if using on the contrary only cationic resins.

Back to FIG. 2, the electrodes channels CE1 and CE2 and the concentration channel are connected on their lower end to the duct 113; the purification channels CP1 and CP2 on the contrary are connected on their lower end to the duct 111. The machine described above operates as follows.

FIG. 1 illustrates a water supply condition from the mains to the tub 101; this phase may represent for example the first supply phase provided by a standard wash cycle of the machine according to the present invention.

To this aim, the machine control system provides for opening the valves 109, VA, 112 and 114, and maintain closed the intercepting device IN. Simultaneously to the opening of the above valves, the machine control system also provides for applying a direct electric voltage between the anode 110B and cathode 11 OC of the decalcifier 110, and supply the discharge pump 106, either intermittently or continuously.

In this way, the water supplied from the mains can flow in the duct 108, overcome the air break AB and flow to the electrochemical cell realized by the decalcifier 110.

The portion of water unable to overcome the air break AB is conveyed for example in a known way inside the tub 101; this water will not be softened but it should be considered that its volume is quite restricted and such not to affect the wash quality negatively.

Water entering the decalcifier 110 is free to flow in the channels CP1 and CP2, so that the resins R1 may soften it as required; in particular, the portion of cationic resins of the H+ type present in the channels CP1 and CP2 will capture the calcium and magnesium cations of the water from the mains. The softened water will then reach the tub 101 through the duct 111 and the machine control system subsequently activate the wash pump 104, which in turn sends the softened water to the sprayer arms 102 and 103.

On the other hand, the water entering the decalcifier 110 which flows in the channels CE1, CE2 and CC is used for regenerating the softening resins R1, as follows.

The electric current flowing through the decalcifier 110 induces the migration to the cathode 110C, through the membranes permeable to the cations 110E, of the calcium and magnesium cations captured by the resins R1; the likely anions migrate on the contrary to the anode 110B through the membranes permeable to the anions 110D under the action of the electric current.

In this circumstance, the membranes permeable to cations 110E hinder the anions from proceeding to the anode 110B, and the membranes permeable to anions 110D hinder the cations from proceeding to the cathode 110C.

Therefore, this process leads to an increased ions concentration inside the concentration channel CC and in the electrode channels CE1 and CE2. In particular, in relation to the objects of the present invention, calcium and magnesium cations originally captured by the resins R1 present in the purification channels CP1 and CP2 will gradually transfer themselves to the concentration channel CC and the channel CE2 of the cathode 110C.

Due to the opening condition of the valve 114 and the closure condition of the intercepting device IN, the water flowing through the channels CE1, CE2 and CC is free to flow through the duct 113 to the drain pump 106, to be discharged from the machine through the duct 107.

In main line it can be seen how the flowrate of the softened water produced by the decalcifier 110 is higher than the flow of the calcareous water exiting the channels CE1, CE2 and CC.

The precise metering of the softened water inside the tub 101, with the relevant closure of the valves 109, VA, 112 and 114, can be obtained with any known technique, for example through the use of a standard pressure-switch or turbine flowmeter, or by means of metering tanks or dosing containers for the wash water of known type and operation.

Moreover, it should be noticed that once the supply of the necessary amount of water to the tub 101 is completed, the control system will stop application of the above voltage between the electrodes 110B and 110C and close the valves 112 and 114, along with the valves 109 and VA; thus, all the various channels of the decalcifier 110 remain practically filled with water.

According to a further significant aspect of the present invention, the valves VA and 112, 144 are provided, in fact, to ensure that during the rest phases, a certain amount of water is always maintained inside the decalcifier 110, so as to have the membranes 110D and 110E always immersed in water; this is to avoid that the membranes may become dry and consequently deteriorate; the same purpose may be reached with other suitable known means, such as the use of siphons.

Crockery washing is performed with known procedures, followed by the liquid drain; this is obtained through the opening of the intercepting device IN and activating the pump 106.

It should be noticed that the presence of resins R1 in the concentration channel CC has the function of intensifying by osmotic pressure the transfer of cations and anions through the central membranes; however, it is clear that the system described above can operates efficiently also if no resins are present within said concentration channel CC.

Additionally, in the example previously described, the resins R1 comprise a mixture of anionic resins and cationic resins; this will prove useful when substantially neutral water from the decalcifier 110 is desired.

It should be considered, on the other hand, that for the purposes of the present invention, the provision of cationic resins of the H+ type alone would be sufficient, considering that only positively charged ions need to be removed from the water required for washing, such as calcium and magnesium ions usually present in the water used by household appliances, which are responsible for calcareous deposits.

Obviously, for such a case, the structure of the decalcifier 110 might be modified accordingly, and in particular simplified with respect to the one previously described.

In the example given above, water supply to the tub 101 has been presumed to be directly performed and metered by known means; as mentioned, these systems may be of different types, such as a known pressure-switch inside the wash tub or appropriate flow or flowrate meters along at least one of the ducts 108 and/or 111.

In a possible variant implementation to the present invention, the water flowing in the decalcifier 110 may be stored in appropriate tanks, for its utilization and/or discharge at later times, instead of flowing directly into the tub 101 and/or to the pump 106; such a variant implementation is illustrated by way of example in FIG. 3.

In this figure, SE1 indicates a tank located on the duct 111, for accumulating the water softened in the channels CP1 and CP2 of the decalcifier 110, whereas SE2 indicates a tank for collecting the water utilized for the regeneration of the resins R1 and flowing in the channels CE1, CE2 and CC of the same decalcifier, located on the duct 113.

Figure 3:
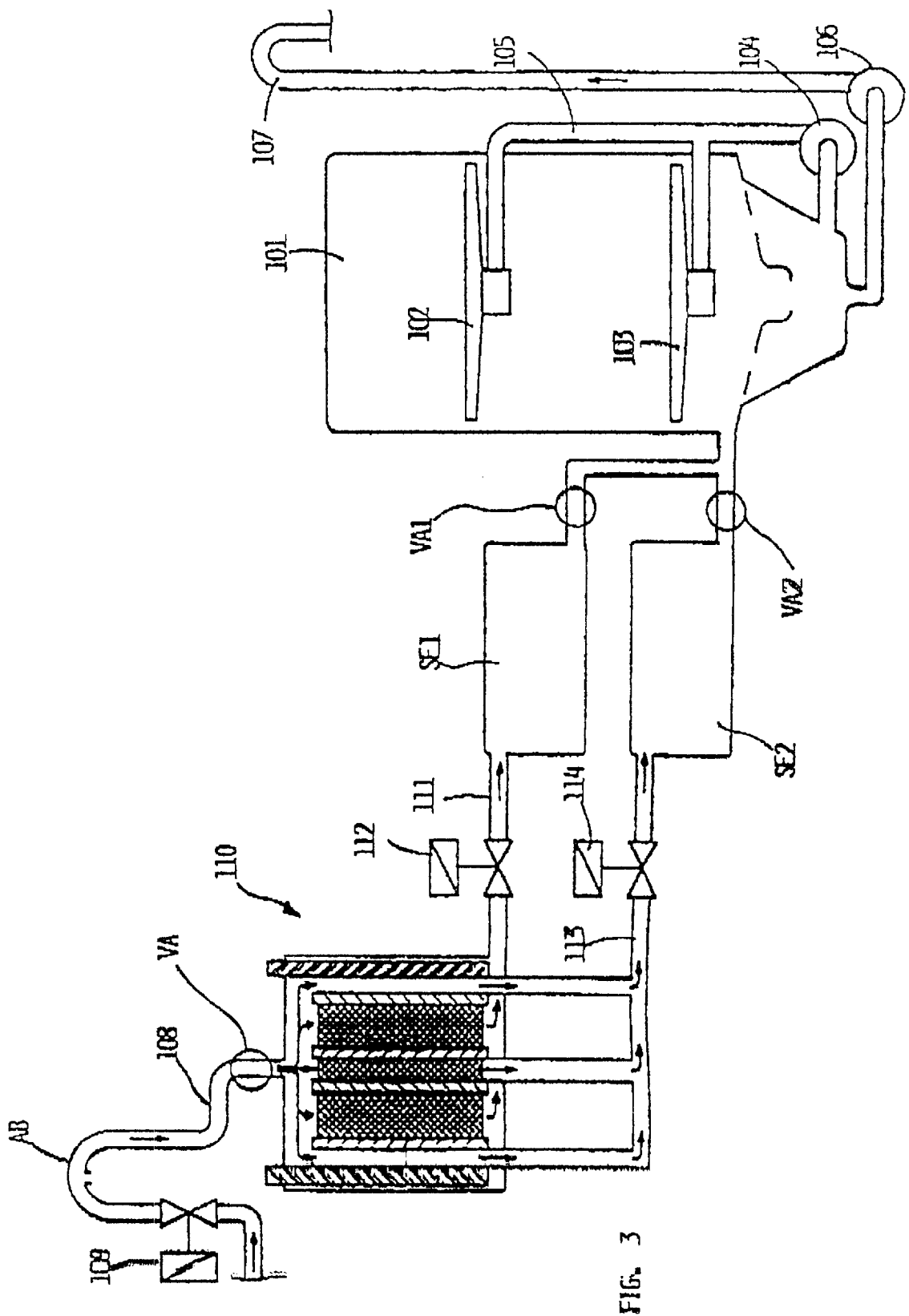
FIG. 3 shows the diagram of a possible variant of FIG. 1.

Moreover, in this figure VA1 indicates a valve located on the duct 111, at the outlet of the tank SE1, whereas VA2 indicates a valve located on the outlet duct of the tank SE2, the latter being connected to the duct 111 or directly to the tub 101; as it can also be seen, the embodiment of FIG. 3 has no longer an intercepting device IN.

The variant implementation of FIG. 3 operates in the same way as previously described with reference to FIGS. 1 and 2, as to water softening and regeneration of the resins R1, but with a different management of the flows exiting the decalcifier.

In particular, according to the proposed implementation, the contents of the tank SE2 can be exploited for performing determined phases provided by a wash cycle, such as when these phases are performed with cold water, or anyway with water having a temperature being below the lime precipitation threshold (typically, lime contained in the water does not precipitate at a temperature below 57° C.).

An example of such an application is as follows.

Let us assume to be at the start of a wash program, and that under such a circumstance the tank SE1 is empty and the tank SE2 is full of water.

Following the start of the wash cycle, the machine control system provides for opening the valve VA2; the contents of the tank SE2 flows to the wash tub 101 and is used for performing the first cold wash phase.

This first phase or prewash can be performed using the water contained in the tank SE2 notwithstanding its high concentration of dissolved calcium and magnesium salts, deriving from the regeneration process of the resins R1, as previously described; this in view of the fact that such a prewash phase is performed with cold water, that lime precipitates only above a certain temperature threshold of the liquid and that prewash phases are usually provided for removing most of the soil adhering to the crockery, mainly through a mechanical action.

Once the tank SE2 has been discharged, the valve VA2 is made to close and the machine performs the cold prewash phase; simultaneously with the execution of this prewash phase, the machine control system enables the opening of the valves 109, VA, 112 and 114, so as fresh water is supplied to the decalcifier 110, and from it to the tanks SE1 and SE2. Obviously, during this phase, the machine control system will also control application of the above voltage between the electrodes 110B and 110C, for performing water softening and regeneration of the resins R1, as previously described.

Thus, while the machine is performing the prewash phase, both tanks SE1 and SE2 will be supplied with softened and calcareous water, respectively.

At prewash end, the control system will discharge the water utilized during that phase from the tub 101, by activating the pump 106.

Following deactivation of the pump 106, the control system will open the valve VA1, for supplying softened water to the tub and perform the second hot phase of the wash cycle, which is executed according to known procedures.

If the tank SE2 has enough capacity, during that second phase of the wash cycle the machine control system is able to control a new water supply in the machine, with a simultaneous decalcifying and resins regeneration process, according to the procedures previously described, so as to take further softened water to the tank SE1 and calcareous water to the tank SE2, which will be used in the subsequent cycle phases (obviously, the contents of the tank SE2 will be used for those phases providing no water heating up to a temperature threshold exceeding the lime precipitation temperature, such as rinse steps with lukewarm or cold water).

Of course, the above system for timely water supply/discharge of the tanks SE1 and SE2 can be optimized with procedures that are obvious for the man skilled in the art, even if differing from the ones previously described by way of example; in this connection, for example, the capacity of the tanks SE1 and/or SE2 may be such to contain a sufficient amount of water for performing several phases of a wash cycle.

In another possible embodiment, the tank SE1 may be omitted and only the tank SE2 be provided; in this event, therefore, the water softened by the decalcifier 110 would be introduced directly into the tub, whereas the calcareous water can be supplied to the tub only during the drain operations of the machine, for its evacuation; therefore, also in agreement with this embodiment, the intercepting device IN can be omitted.

Moreover, theoretically, the metering of the water being necessary for the washing to the tub 101 can be obtained through a series of subsequent water supply and discharge cycles of the tanks SE1 and/or SE2, in which case the capacity of such tanks may be equal to a fraction or portion of the total amount of water required for performing a wash phase in the tub.

Therefore, for such applications the machine control system provides for opening the valves 109, VA, 112, 114, VA1 and/or VA2, so as to obtain a gradual filling of the tanks SE1 and SE2; once they have been filled, as detected through a sensing system, e.g. a float-microswitch, the control system provides for the valves 109, VA, 112 and/or 114 to close, so as to have a volumetrically defined amount of water in the above tanks and the relevant lengths of the duct 108, 111 e 113; then the control system will provide for the valve VA1 and/or VA2 to open, to let the water reach the tub 101.

It is clear that, according to the capacity chosen for the hydraulic circuit previously described, the above sequence may be repeated, and different combinations of the mentioned means and/or operative procedures worked out.

Figure 4:
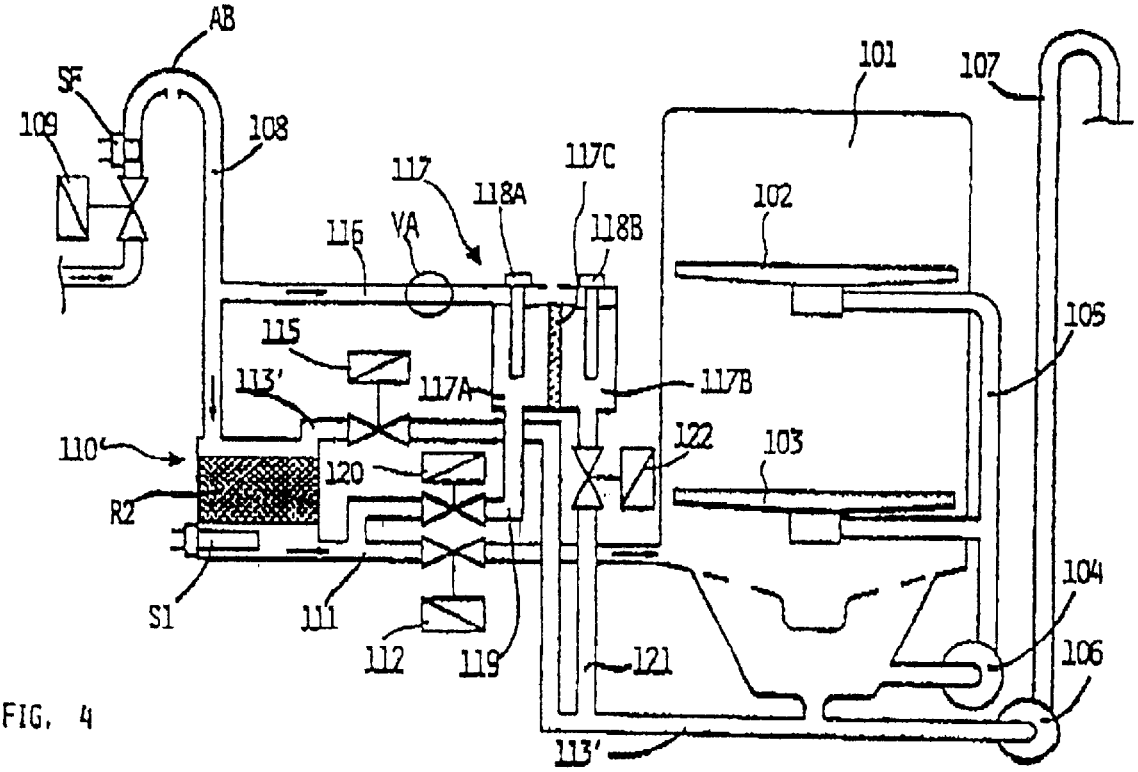
FIG. 4 shows the basic diagram of a further embodiment of the washing machine according to the present invention, in a first operating condition.
Figure 5:
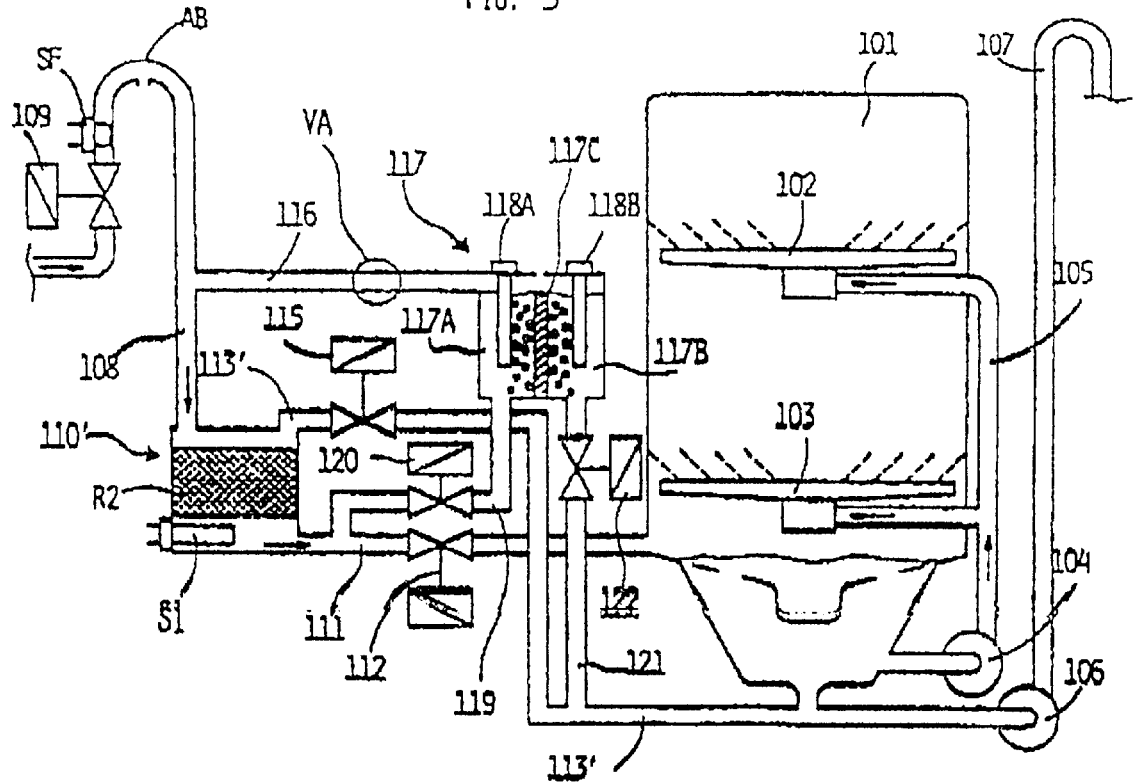
FIG. 5 shows the basic diagram of the washing machine represented in FIG. 4, in a second operating condition.
Figure 6:
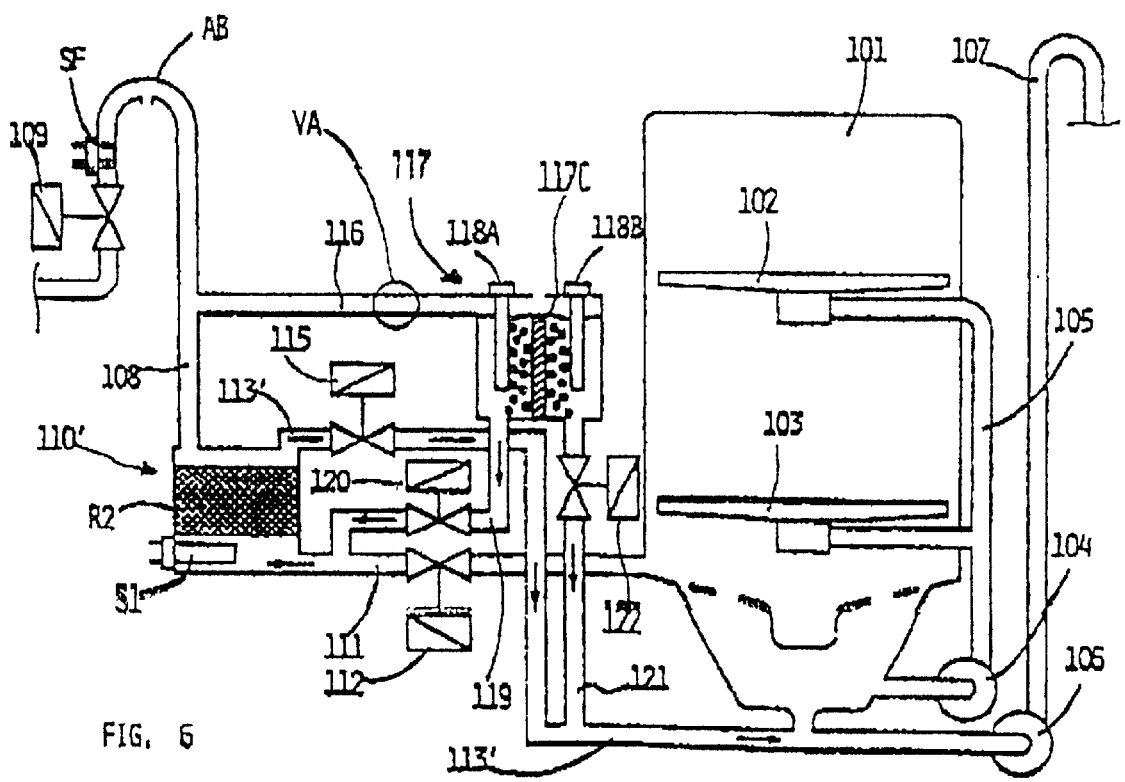
FIG. 6 shows the basic diagram of the washing machine represented in FIG. 4, in a third operating condition.

FIGS. 4, 5 and 6 illustrate a further possible embodiment of the present invention, where the same reference number of the previous figures are used to indicate technical equivalent elements.

In this instance, the machine according to the present invention has a decalcifier 110' substantially similar to conventional decalcifiers; however, according to the present invention and differently from the present state of art, the resins R2 contained in the decalcifier 110' are cationic resins of the H+, instead of being of the Na+ type.

Reference 116 indicates a duct departing from the duct 108 at an intermediate location between the air break AB and the decalcifier 110', and ending in a collecting tank indicated with 117; the duct 116 has a valve VA, whose functions have been previously described.

This tank 117 is divided in at least two separate chambers 117A and 117B, by means of a wall 117C permeable to ions, preferably being constituted by a membrane of the bipolar type; also this type of membranes is known as such and does not require a description herein; it will be enough to point out that membranes of the bipolar type have at least a portion being permeable to anions and at least a portion being permeable to cations.

An electrode is housed in each chamber; in particular, the chamber 117A houses a cathode 118A, whereas the chamber 117B houses an anode 118B.

A duct 119 departs from the lower portion of the chamber 117A; the other end of this duct 119 is connected to the duct 111 in an intermediate location between the relevant outlet from the decalcifier 110' and the valve 112 (or directly to the decalcifier 110'); a known valve 120 controlled by the machine control system is provided on the duct 119.

From the lower portion of the chamber 117B a duct 121 departs, which is connected to a drain duct indicated with 113', being in communication with the pump 106; at an intermediate location, the duct 121 has a valve 122 of the known type and controlled by the machine control system.

As it will be seen later, the tank 117, the ducts 119 and 121 and the valves 120 and 122 are provided for containing and treating water required for the regeneration of the resins R2 contained in the decalcifier 110', and convey it to the latter according to appropriate times and procedures.

The decalcifier 110' may comprise first sensing means schematically indicated with S1, which are provided for detecting some operative parameters, such as conductivity, water hardness degree and temperature of the water flowing out from the decalcifier 110', and its pH degree.

From the decalcifier 110' the above cited duct 113' also departs; in an intermediate location between the decalcifier and the outlet of the tub 101, on said duct 113', a valve 115 of the known type is present, controlled by the machine control system. As it will become apparent later, also the duct 113' and the valve 115 are used for regenerating the resins R2 contained in the decalcifier 110'.

The machine shown in FIG. 4 operates as follows.

FIG. 4 represents a water supply condition from the mains to the tub 101 and the tank 117; this phase may be for example the first supply phase provided by a standard wash cycle of the machine according to the present invention.

To this purpose, the machine control system provides for opening the valves 109, VA and 112 and maintaining the valves 115, 120 and 122 closed.

In this way, the water supplied from the mains can flow along the duct 108, overcome the air break AB, flow partially to the decalcifier 110' and partially to the tank 117, through the duct 116.

The water conveyed to the decalcifier 110' flows across the resins R2, so as to be softened, and then further proceeds to the wash tub 101, through the duct 111; the control system will subsequently activate the wash pump 104, which sends the softened water in turn to the sprayer arms 102 and 103.

A precise metering of the softened water within the tub 101 can be obtained through any known technique, such as a standard pressure-switch or turbine flow meter (indicated with SF in FIGS. 4–6), or through metering tanks or containers for the wash water, whose type and operation is known as such.

While the valve VA is open, the water flowing along the duct 116, after overcoming the air break AB, can reach the tank 117 for its filling; it will be appreciated that the tank 117 can be filled according to any known techniques.

For example, the section of the duct 116 and the total capacity of the tank 117 can be chosen to have the latter completely filled during a normal water supply phase in the tub, and once the tank 117 is completely filled, its excess water can overflow to the decalcifier or to the tub itself (this can be provided for example through an overflow outlet from the tank 117).

Another possibility is that of having the control system closing the valve VA once the filling condition of the tank 117 has been reached; for example, the increasing water level in the chamber 117B (which is filled in series with the chamber 117A) can be exploited to cause a float to raise, so as to switch a microswitch upon reaching a predetermined level; such a switching is used by the machine control system as a criterion for determining the closure of the valve VA, and hinder a further water flow to the tank 117.

FIG. 5 illustrates a wash phase wherein the tank 117 is already filled with water; in this case, therefore, the pump 104 is active and the wash liquid (water plus likely detergents and/or additives) is sprayed on the crockery contained in the machine, by means of the sprayer arms 102 and 103.

At a time prior to the regeneration phase (such as during the same wash phase of FIG. 5), with the valves 120 and 122 being closed, the machine control system will apply a direct voltage between the electrodes 118A and 118B; thus, the electric current applied produces a transfer of the cations (H+) through the membrane 117C, from the water contained in the chamber 117B to the water contained in the chamber 117A, and a transfer of the anions (OH−) through the membrane 117C from the water contained in the chamber 117A to the water contained in the chamber 117B.

After a preset time interval, the control system will cease the application of the electric current to the electrodes 118A and 118B; in this way, for example, the chamber 117A will have water particularly charged with cations (H+), whereas the water contained in the chamber 117B is particularly charged with anions (OH−), which are particularly obtained through the water scission.

Therefore, following the above process, the water contained in the chamber 117B will be highly basic, rich of OH−, with a likely oxygen formation, whereas the water contained in the chamber 117A is highly acid, rich of H+, with a likely hydrogen formation; to this purpose, the electrochemical cell may eventually be fitted with vent openings and/or valves.

FIG. 6 illustrates the subsequent regeneration phase of the resins R2 of the decalcifier 110', which is performed using the water contained in the chamber 117A, treated as described above.

To that purpose, the machine control system provides for opening the valves 120, 115 and 122; vice-versa, the valves 109 and 112 are maintained closed by the control system.

The water contained in the chamber 117A appropriately treated is flown through the duct 119 to the decalcifier 110'; since during that phase the valve 112 is closed, the water tends to enter the decalcifier 110' and flow across the resins R2, and then out through the duct 113'.

The water charged with cations used for regeneration purposes flows then counter-current across the resins R2, i.e. in opposite direction to normal water used for washing supplied during a normal supply to the duct 108; this because it has been ascertained that also in this instance a water transfer counter-current allows a more efficient regeneration of the resins R2, i.e. a better removal of the calcium and magnesium ions adhering to the resins and a simultaneous removal of likely soil mechanically restrained within the resins bed.

While the valve 115 is open, the water utilized for regeneration purposes is conveyed through the duct 113' to the pump 106, to be discharged from the machine; also the water contained in the chamber 117B can flow to the duct 113', since the valve 122 is open, to be then discharged by mean of the pump 106.

It is underlined how in this instance the regeneration phase of the resins R2 can be performed inside the decalcifier 110' at least partially in water static conditions; to that purpose, therefore, during determined times of the regeneration phase, the valve 115 can be maintained appropriately closed to allow stagnation of the water inside the decalcifier 110'; the subsequent opening of the same valve 115 will provide for water discharge and inflow of new regeneration water eventually still available in the tank 117 and/or in the duct 119.

A likely washing of the resins will follow for removing loose calcium residues. Efficiency of the softening system can be eventually improved by performing the resins regeneration phase with the water already softened.

Figure 7:
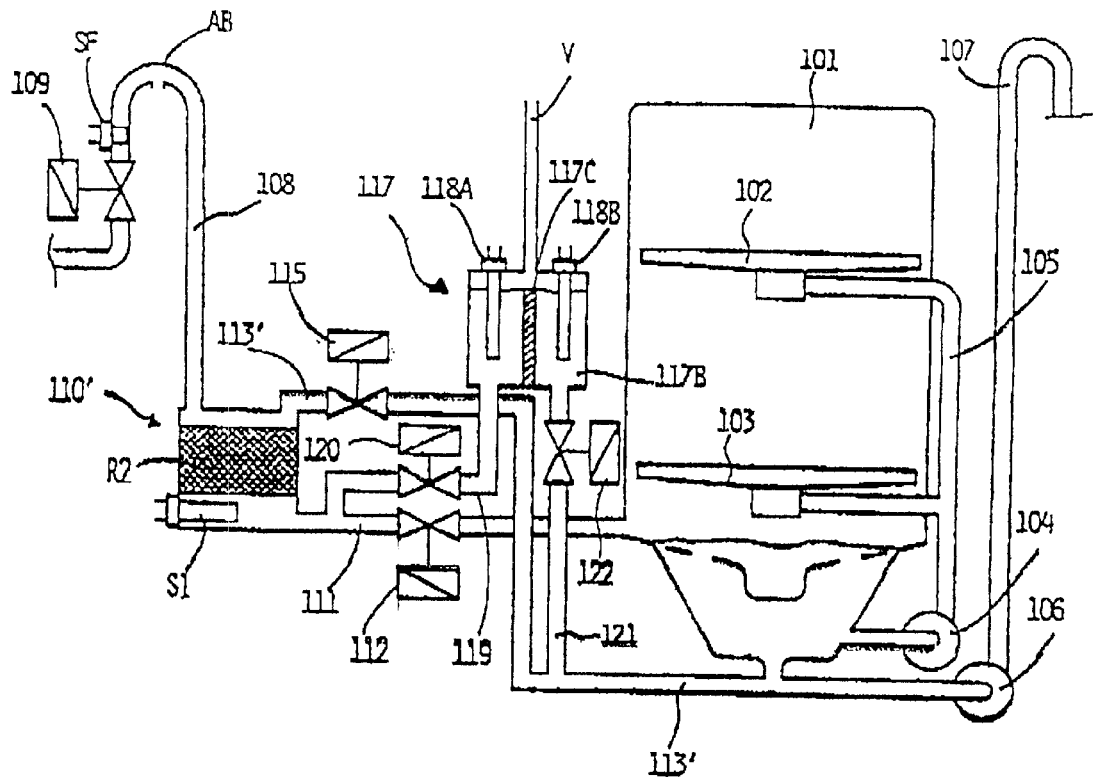
FIG. 7 shows the basic diagram of a possible variant of the washing machine according to the embodiment of FIG. 4.

FIG. 7 illustrates to this purpose a further possible embodiment of the washing machine according to the present invention, where the same reference numbers of the previous figures are used to indicate technical equivalent elements; in particular, the basic circuit of FIG. 7 is similar to the one represented in FIGS. 4–6, but with an amended control system for the various valves, in order to avoid the need of the duct 116.

The dishwashing machine represented in FIG. 7 operates as follows.

As to water supply into the tank or cell 117, the machine control system provides for the opening of the valves 109 and 120 only, so that the water entering from the duct 108,; after flowing across the resins R2, will not flow in the ducts 111 and 113', due to the valves 112 and 115 being closed, but flow along the duct 119 to reach the tank 117, by virtue of the principle of communicating vessels and/or network pressure.

Upon reaching the desired filling level of the regeneration tank 117, which is detected for example as already described above, the machine control system will provide for the closure of the valves 109 and 120.

Thus, the tank 117 is filled with the regeneration water required, already softened, to be electrically treated as above described, so as to perform the regeneration phase at the appropriate time; it should be noticed that for this embodiment the tank 117 preferably provides an upper vent opening V.

In order to supply water to the tub, the control system provides for the opening of the valves 109 and 112, i.e. with procedures similar to the ones described with reference to FIG. 4; the same applies for the regeneration phase of the resins R2, which will be substantially performed as described with reference to FIG. 6, and due to the tank 117 being located at a higher level with respect to the decalcifier.

With reference to the various embodiments of the present invention shown by way of example with reference to FIGS. 4–7, it should be added that the regeneration phases of the resins are not necessarily performed for each wash cycle, but preferably less frequently, for example after a certain preset amount of water has been softened.

Another possibility is the use of suitable water hardness detectors employed by the machine control system for checking the hardness degree of the water flowing out of the decalcifier.

In this case, the control system will perform the regeneration phase for example when the water hardness degree detected exceeds a predetermined threshold, indicating that the softening efficiency of the resins is approaching exhaustion.

Finally, the wall 117C may also consist of a cationic membrane, or anionic membrane, instead of a bipolar membrane, or still at least two parallel membranes of both types may be provided.

Moreover, one same cell 117 used for regenerating the resins R2 may also be utilized for producing acid water and/or basic water for the washing of the crockery.

Figure 8:
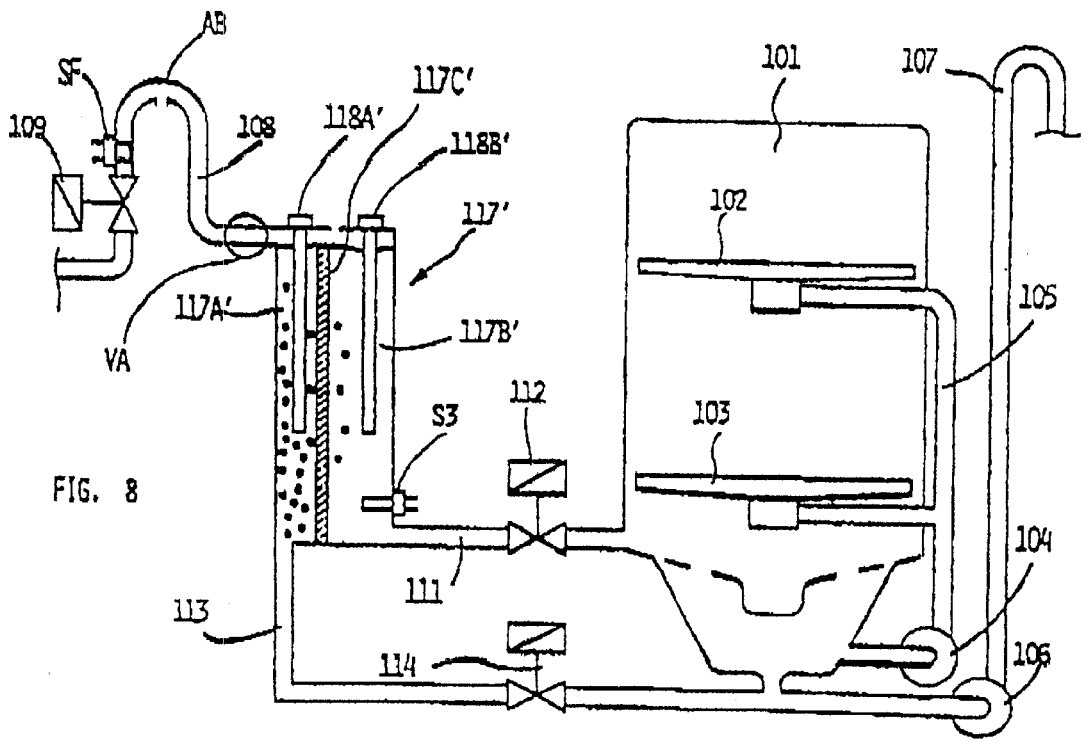
FIG. 8 shows the basic diagram of a further possible embodiment of the washing machine according to the present invention, in a first operating condition.
Figure 9:
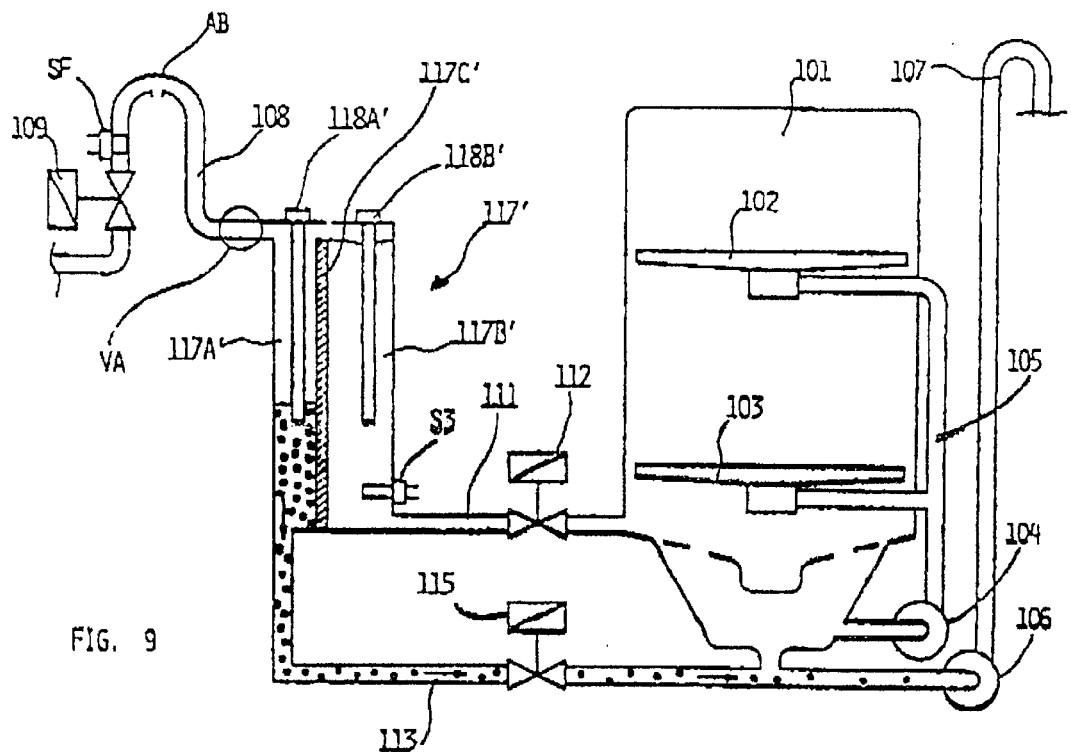
FIG. 9 shows the basic diagram of the washing machine represented in FIG. 8, in a second operating condition.
Figure 10:
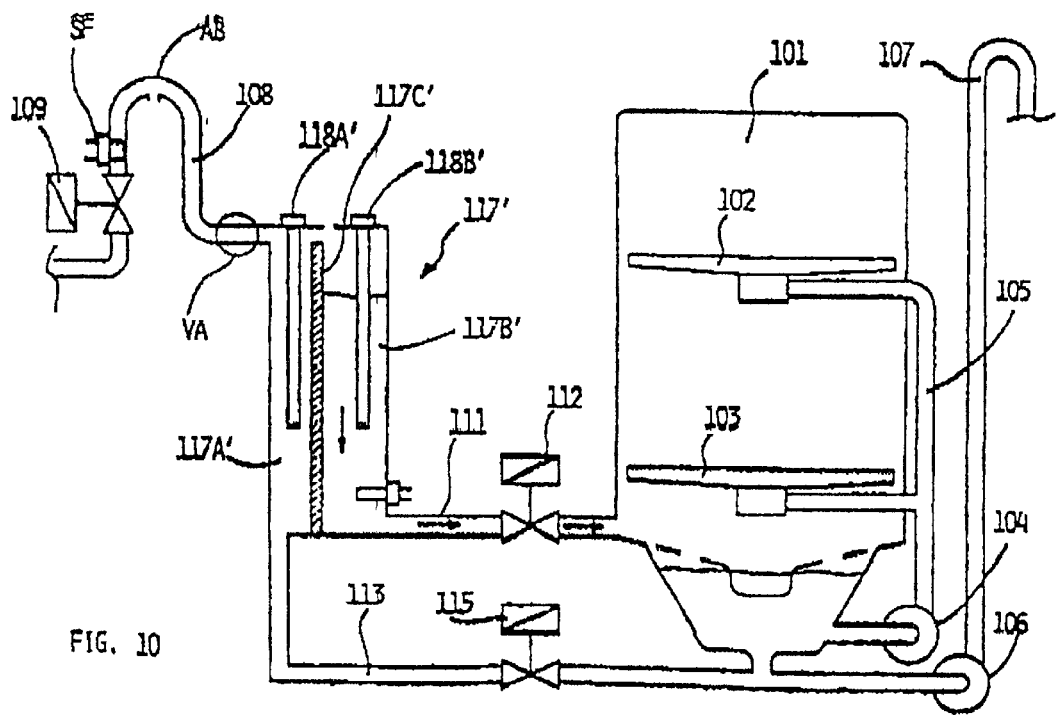
FIG. 10 shows the basic diagram of the washing machine represented in FIG. 8, in a third operating condition.

A further possible implementation of the present invention is illustrated in the FIGS. 8, 9 and 10, which is based on an electrochemical decalcifying system, which does not require the use of softening resins. Also these figures use the reference numbers of the previous figures to indicate technical equivalent elements.

In this case, the duct 108 is connected to a tank 117' downstream the air break AB. This tank 117' is divided in two separate chambers 117A' and 117B' by means of a wall permeable to ions, such as a membrane permeable to cations, indicated with 117C'; each chamber 117A', 117B' houses an electrode; in particular, the chamber 117A' houses an anode 118A', and the chamber 117B' a cathode 118B'.

From the lower section of the chamber 117B' the duct 111 departs, communicating with the tub 1, on which the valve 112 is provided; from the lower section of the chamber 117 A' the outlet duct 113 departs, communicating with the delivery side of the pump 106, on which the valve 114 is located.

The tank 117' may comprise sensing means schematically indicated with S3, which are provided for detecting some operative parameters, such as conductivity, hardness degree, level, etc., of the water related to the tank 117'.

The machine illustrated in FIG. 8 operates as follows.

FIG. 8 illustrates a water supply condition to the tank 117'; this phase may be for example the first supply phase provided by a normal wash cycle of the machine according to the present invention. To this purpose the machine control system will provide for the opening of the valves 109 and VA, and maintain the valves 112 and 114 closed.

Thus, the water from the mains can flow through the duct 108, overcome the air break AB and gradually fill the tank 117'. To this aim, the upper portion of the chamber 117B' may be fitted with a float level sensor, as described above.

Therefore, by way of example, the water entering the tank 117' will first fill the chamber 117A' up to the top level of the membrane 117C', which operates as an overflow; the further supply of water to the tank 117' will then also gradually fill the chamber 17B'; at a certain point the increasing water level in the chamber 117B' will cause a float to raise and switch a microswitch upon reaching a preset level; such a switching is used by the machine control system as a criterion for closing the valves 109 and VA and hinder a further water flow to the tank 117'; according to a possible variant implementation, the tank 117' may have two separate inlets for the chambers 117A' and 117B', each one having a relevant valve, instead of filling the chambers by overflow.

In any way, upon reaching such a condition, both chambers 117A' and 117B' will be filled with volumetrically defined amounts of water.

Now, with the water under static conditions in the tank 117', the machine control system will provide for the direct voltage to be applied between the electrodes 118A' and 118B'; thus, the electric current applied causes the cations of the water contained in the chamber 117B' to be transferred through the membrane 117C' to the water contained in the chamber 117A'.

After a preset time, the control system will cease application of the electric current to the electrodes 118A' e 118B'; thus, the water available in the chamber 117B' is free of cations, in particular calcium and magnesium cations; vice-versa, the water in the chamber 117A' will be particularly rich of such cations. As it can be seen, according to such an embodiment, the water supplied by the mains is submitted to electric decalcification in substantial static water conditions.

FIG. 9 illustrates the subsequent discharge phase of the water contents from the chamber 117A'; to this aim, the machine control system will cause the valve 115 to open, so that the contents of the chamber 117A' reaches the pump 106, through the duct 113, to be discharged through it from the machine.

Vice-versa, FIG. 10 illustrates softened water supply to the tub 101; to this aim, the machine control system provides for the valve 112 to open, so that the softened water contained in the chamber 117B' will reach the tub 101.

It is clear from the previous example that the capacity of the chamber 117B' along with the relevant lengths of the duct 108 and 111 will be chosen for containing a sufficient amount of water for performing a wash phase in the tub; obviously, nothing will hinder metering the water required for washing to be supplied to the tub 101 through a series of supply and emptying cycles of the chamber 117B', in which case the capacity of the latter equals a fraction or portion of the total amount of water required for performing a wash phase in the tub.

It will be appreciated that the sequence of the above operative phases may be changed and/or inverted, as the case may be.

It is still underlined how in a particularly advantageous embodiment of the invention the supply and softening systems described above or a part of them may all be fully or just partially integrated in one sole device; in this frame, the air break AB and/or the tank SE1 and/or SE2, the tank 117 or 117', the decalcifier 110 or 110' if provided, and the various valves described, with all relevant associated elements (sensors, ducts, etc.) may be incorporated in one or more of the obtained units, for example made of thermoplastic material, and inserted in the machine cabinet at least on one side of the tub 101.

Moreover, the divisor elements of the various channels or treatment chambers according to the present invention, instead of being realized through membranes, could be constituted by appropriate bed of resin permeable to ions, known as such.

The features of the present invention are clear from the above description, and also its advantages are apparent. In particular:

- the household appliance according to the present invention does not require any special consumption media, such as salt, in order to regenerate the decalcification resins; therefore it is no longer necessary to provide periodical maintenance/actions to the machine for topping up said regenerating media, or special signalling means whose function is to warn the user about such a need of topping up;
- the household appliance is fitted with specific means for connection to just one sole water source at room temperature, if required;
- the household appliance is fitted with special means for allowing to realize an efficient resin utilization, when provided, and an efficient resins regeneration, which means are improved compared to the present state of the art, so as to increase their useful life and allow to replace them after a considerable longer period compared to the known solutions;
- according to the invention, the above actions/maintenance can be avoided also when decalcification resins are utilized.

It is clear that many other changes are possible for the man skilled in the art to the household appliance utilizing water, in particular a washing machine, described above by way of example, without departing from the novelty spirit of the innovative idea.

It is possible, among others, to combine two or more decalcification systems as previously described, or their relevant components, in order to reach the proposed aims.

It is clear that many other changes are possible for the man skilled in the art to the household appliances utilizing water, in particular a washing machine described above by way of example, without departing from the novelty spirit of the innovative idea.

For example, in the case of the embodiment of FIG. 4, it would be possible to utilize the basic water produced in the chamber 117B and/or the acid water produced in the chamber 117A for deterging the crockery during an initial phase of the wash cycle; this considering that some detergent agents are strongly basic (pH up to 11,5), as well as acid (for example citric acid of lemon), to fight various soil types.

To this purpose, deviator valves could be provided instead of the valves 120 and 122, respectively, being apt to deviate said basic and/or acid water to the tub 101, or to spray it directly on the crockery through an appropriate device, and let it react for a certain time before a subsequent rinsing (obviously both types of water would be supplied or sprayed at different times to avoid their mutual inhibition).

Basic and/or acid water may also be stored in one or more storage tanks, for its subsequent use and be produced during a regeneration process, for its use in an initial phase of a subsequent wash cycle; in alternative, this water may be obtained during several wash cycles, so as to store a good volume also with a small size electrochemical cell, and then be utilized in a subsequent cycle.

A further implementation would be to provide the electrochemical cell with gas suction means for the gases produced therein (as mentioned, hydrogen and oxygen) for a subsequent use (such as for disinfecting, bleaching, etc.) and/or their appropriate evacuation or suppression.

A further variant implementation is to heat water in the electrochemical cell during the regeneration, as this would speed up and/or improve the process; this could be obtained through an appropriate heater in correspondence of the container of the softening resins or the tank containing the water for regeneration; in alternative or additionally, it would even be possible to exploit the heat dispersed from the machine wash tub during the hot wash phases, or a heating induced by a temporary circulation of a high electric current.

According to a further advantageous implementation in the event of the embodiment of FIGS. 1–3, the machine according to the present invention may be fitted with an electric supply device for the electrodes of the electrochemical cell, controlled by the machine control system, providing for voltage and/or power and/or current adjustment, in particular of the variable type and/or pulse type (for example of the "switching" type or "Pulse Width Modulation" type) and/or reversible polarity.

The possibility of adjusting these parameters allows for example a reduction of the initial current peak (with saturated resins) and then to increase the voltage when the current tends to decrease (reduction of the circulating ions, with nearly regenerated resins).

Another variant implementation, related to the embodiment of FIGS. 1–3, is to circulate in the channels CE1, CE2 e CC of the decalcifier 110 only already softened water; therefore, according to this variant implementation, the water inlets for said channels would be branched off the outlet of the channels CP1 and CP2.

Always with reference to the embodiment of FIGS. 1–3, appropriate means may be provided for proper flows calibration in the outlet ducts of the softened water (i.e. duct 111) and calcareous water (i.e. duct 113); such means could consist for example of throughways having predetermined section, or a flow controller, or still proportional valves (e.g. valves 112 and 114 could be proportional valves); this in order to optimize the efficiency of the device and/or the resins regeneration.

According to a further embodiment of the present invention, the machine control system may be programmed for realizing a regular inversion of the polarity of the electrodes provided in the electrochemical cell, so as to favour the cleaning of its membranes.

A further variant implementation in the event of the embodiment of FIGS. 8–10 is to provide cationic resins of the H+ type in the chamber 117B', so as to have such resins retaining calcium quickly, for a faster water softening and supply to the tub.

Always with reference to the embodiment of FIGS. 8–10, the electric voltage applied to the electrodes of the electrochemical cell realized by the tank 117' may be performed under dynamic conditions of the water flow, i.e. with a light flow in the chamber 117A' and/or 117B'.

Further variant implementations may then relate to the electrodes used in the electrochemical cell, which could either be metallic (e.g. steel) or non metallic (e.g. graphite, carbon, conductive plastic), or a combination of the above two type.

A water pre-filtering system may be advantageously provided upstream the decalcifier 110 of FIG. 1, for example of the mechanical or magnetic or electromagnetic type, in particular a self-cleaning system, providing for example a periodic counter-current washing and bleeder. Such a pre-filtration is advantageously provided for retaining impurities, sand, iron residues, etc., which could damage the decalcifier and/or the electrochemical cell and/or the membranes of the system.

Finally, it is reminded that in some countries, standards are in force according to which washing machines should not drain in the sewage system water with a temperature higher than a predefined level, such as about 60° C.

Should the user select a wash program utilizing water with a higher temperature than the preset threshold (for example 90° C. for a laundry washing machine), then the machine has to be fitted with means for reducing the water temperature, before its draining.

Within this frame, the water resulting from the softening or regeneration process not utilized for washing purposes may be discharged in concurrence with the discharge of the hot wash liquid, in view of lowering its temperature.

Also in the event of the embodiments shown in FIGS. 5–7 and 8–10, the machine control system is advantageously programmed to maintain a certain volume of water in the tanks 117 and 117' also when the machine is not in use, so as to keep the relevant membranes damp and avoid their drying up.

Another possible variant implementation provides at least a container downstream the air break AB and upstream the electrochemical cell 110 or 117' or decalcifier 110', for containing and/or metering the water to be softened; this container can be used e.g. for a fast supply/metering of the water and its slow outflow. This container may eventually be pressurized, through known means, in order to speed up the water flow across the softening resins.

Moreover, the electrochemical cell 110 of FIGS. 1–3 may be eventually deprived of resins R1 for ensuring operation as described with reference to FIGS. 8–10.

Finally, it is clear that the invention, besides the field of washing machines, can be in general applicable to any household appliance utilizing water, such as drinks making machines (coffee or similar), steam generators, ironing apparatuses, boilers, etc., comprising a treatment container or ducts to be supplied with water.

What is claimed is:

1. A household appliance comprising
a control system, for controlling the execution of a treatment cycle of the appliance, said treatment cycle comprising a plurality of distinct phases performed using water,
a water supply system for supplying water from an external source,
a softening system for softening at least a portion of the supplied water,
an electrochemical cell for treating at least a portion of the supplied water, said electrochemical cell comprising
a positive electrode and a negative electrode,
electric means for applying an electric voltage across, or a flow of electric current between, said electrodes,
a plurality of channels for water passage defined between said electrodes,
water storage means,
intercepting means for controlling at least the admission of water into said electrochemical cell and/or storage means, and the discharge thereof into a treatment tub or container of the appliance; and
water sensor means associated with said control system,
whereby said electrochemical cell is an active part of said softening system, a first one and a second one of said channels is adapted to receive water used for softening and a third one of said channels is adapted to receive water to be softened, said third channel being interposed between said first and second channels, said softening system being operative for inducing, once a flow of electric current is applied between said electrodes, at least hardness ions of water present in said third channel to pass into water in said second channel, while preventing, at the same time, hardness ions from water present in said first channel from passing into water present in said third channel, said control system being programmed for controlling,
said flow of electric current, depending upon the phases of said treatment cycle and/or measures carried out through said sensor means,
said intercepting means, for controlling the admission of water to said storage means and/or said treatment container.

2. A household appliance, according to claim 1, wherein to said channels are free of resins.

3. A household appliance, according to claim 1, wherein said control system is programmed for periodically inverting the polarity of said electrodes.

4. A household appliance, according to claim 1, wherein said control system is programmed for modifying the flow of electric current between said electrodes.

5. A household appliance, according to claim 1, wherein said storage means comprises
first means for the storage of water passing through at least said first channel and said second channel, and
second means for the storage of water passing through at least said third channel.

6. A household appliance, according to claim 5, wherein said intercepting means is adapted to control the admission of water into said first and second storage means and the discharge thereof into said treatment container of the appliance.

7. A household appliance, according to claim 6, wherein said sensor means comprises first sensor means for detecting the hardness level of water and said control system is programmed for
controlling said flow of electric current as a function of measures carried out through said first sensor means,
controlling said intercepting means for discharging into said treatment container
water stored within said first storage means for performing at least a phase of a treatment cycle requiring cold water;
water stored within said second storage means for performing at least a phase of a treatment cycle requiring hot water.

8. A household appliance, according to claim 1, wherein said storage means are adapted to contain a water quantity sufficient for the execution of at least a respective phase of said treatment cycle.

9. A household appliance, according to claim 1, wherein said storage means are adapted to contain a water quantity sufficient for the execution of a plurality of phases of said treatment cycle.

10. A household appliance, according to claim 1, wherein the capacity of said storage means equals a fraction of the total quantity of water necessary for the execution of a phase of said treatment cycle.

11. A household appliance, according to claim 1, wherein said control system is programmed for successively supplying and discharging said storage means.

12. A household appliance, according to claim 1, wherein said water sensor means comprise at least one of the group consisting of a water level sensor, a water temperature sensor, and a water pH degree sensor.

13. A household appliance, according to claim 1, wherein said water sensor means comprises at least one of the group consisting of a water hardness sensor and a water conductivity sensor.

14. A household appliance, according to claim 1, further comprising a tank for containing and/or metering the water to be softened, said tank being upstream of said electrochemical cell.

15. A household appliance, according to claim 1, wherein
said first channel is delimited at one side by at least an anion permeable divisor element,
said second channel is delimited at one side by at least a cation permeable divisor element,
said third channel is delimited at one side by said anion permeable divisor element and at another side by said cation permeable divisor element.

16. A household appliance, according to claim 15, further comprising an intermediate channel between two of said third channels, said intermediate channel being delimited at one said by the anions permeable divisor element of one of said third channels and at the other side by the cations permeable divisor element of the other of said third channels.

17. A household appliance, according to claim 1, wherein said control system is programmed for controlling the supply of said storage means while a treatment cycle of the appliance is being performed.

18. A household appliance, according to claim 1, wherein said control system is programmed for controlling said electric means while a treatment cycle of the appliance is being performed.

19. A household appliance, according to claim 1, wherein said control system is programmed for storing softened water in said storage means while a treatment or washing cycle of the appliance is being performed.

20. A household appliance, according to claim 1, wherein said electric means comprise means for the adjustment of electric voltage and/or electric power and/or electric current.

21. A household appliance, according to claim 15, further comprising means for preventing said divisor element from becoming dry, said means comprising valves and/or siphons.

22. A household appliance, according to claim 1, wherein at least a portion of said permanent water softening means is integrated in one sole device having a body comprising thermoplastic material.

23. An electrochemical cell, for use in a household appliance using water, comprising
a positive electrode and a negative electrode,
electric means for applying an electric voltage across, or a flow of electric current between, said electrodes,
a plurality of channels for water passage defined between said electrodes,
water storage means,
intercepting means for controlling at least the admission of water into said electrochemical cell and/or storage means, and the discharge thereof into a treatment tub or container of the appliance; and
water sensor means associated with said control system, a first one and a second one of said channels being adapted to receive water used for softening and a third one of said channels being adapted to receive water to be softened, said third channel being interposed between said first and second channels, said softening system being operative for inducing, once a flow of electric current is applied between said electrodes, at least hardness ions of water present in said third channel to pass into water in said second channel, while preventing, at the same time, hardness ions from water present in said first channel from passing into water present in said third channel.

* * * * *